Nov. 24, 1953 G. A. LYON 2,660,480
WHEEL COVER
Filed Dec. 12, 1947 2 Sheets-Sheet 1
Fig. 2.
Fig. 1.
Fig. 3.
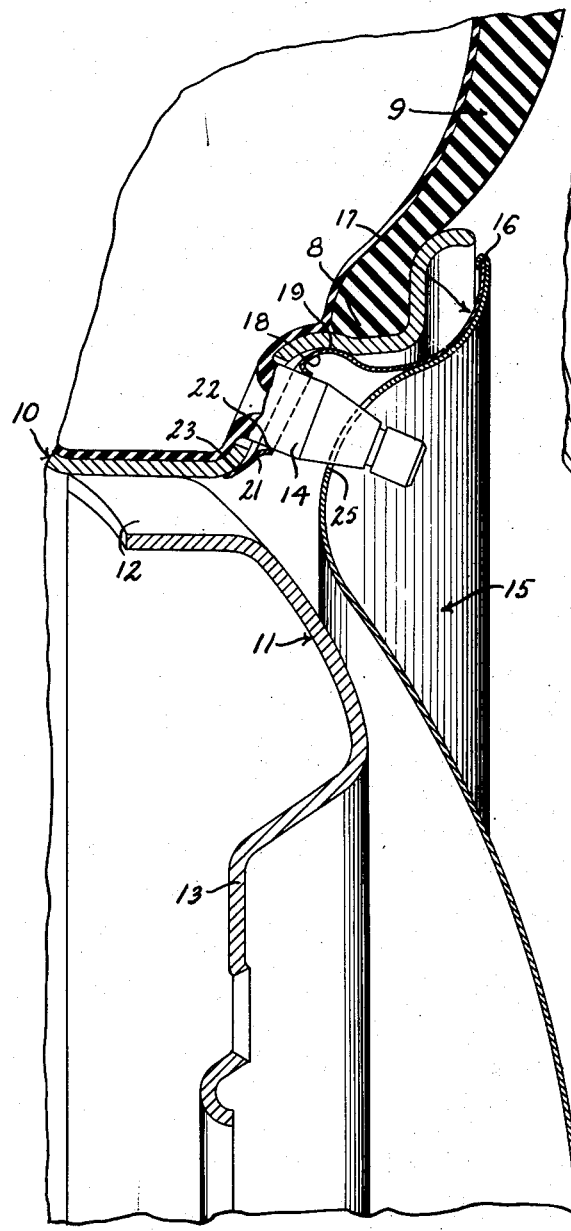
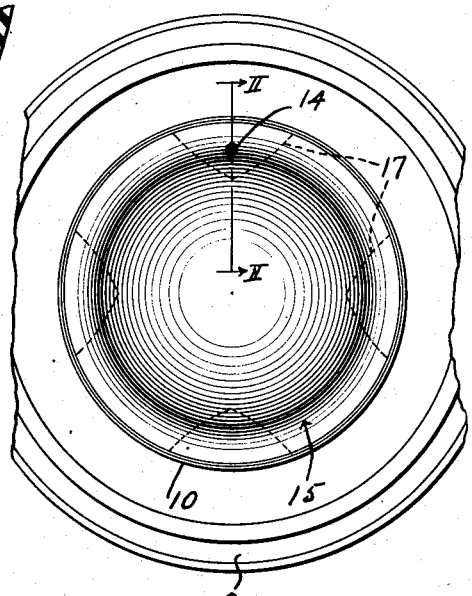
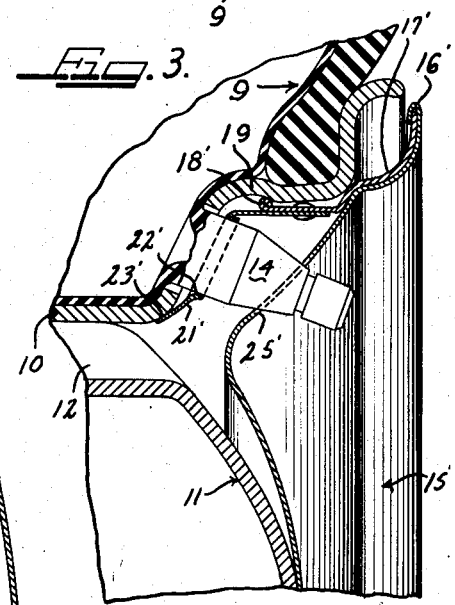
Inventor
GEORGE ALBERT LYON
The Firm of Charles W. Hills
by Attys.

Nov. 24, 1953  G. A. LYON  2,660,480
WHEEL COVER
Filed Dec. 12, 1947  2 Sheets-Sheet 2

Inventor
GEORGE ALBERT LYON
The Firm of Charles W. Hills
by  Attys.

Patented Nov. 24, 1953

2,660,480

UNITED STATES PATENT OFFICE 2,660,480

WHEEL COVER

George Albert Lyon, Detroit, Mich.

Application December 12, 1947, Serial No. 791,303

11 Claims. (Cl. 301—37)

This invention relates to a wheel structure and more particularly to a wheel cover for an automobile wheel and retaining means for the cover.

An object of this invention is to provide a cover and retaining means therefor which can be economically manufactured from the same stamping as the body of the cover.

Another object of this invention is to provide a wheel cover with retaining means nestingly carried by the rear side of the cover and arranged to not only retain the cover on the wheel but also to center the cover and bottom it on one of the parts of the wheel.

Another object of this invention is to provide a cover with snap-on detachable retaining means cooperable with a wheel of the type having a so-called safety groove in one of the rim flanges.

Yet another object of the invention relates to the provision of a cover with retaining means of such character that it can cooperate with a base of a valve stem in assisting in the centering and positioning of the cover on the wheel.

In accordance with the general features of this invention there is provided in a wheel structure, including a wheel having a body part and a multi-flanged tire rim part connected thereto and a generally axially extending flange with an annular groove therein, a cover comprising a convexly dished circular member disposed on the wheel rim part and cover retaining means nested in the rear side of the convexly dished member and fastened thereto, said retaining means extending axially rearwardly and including radially outwardly projecting protuberance means of a diameter such that it can be snapped into the rim part groove.

Yet another feature of the invention relates to making the retaining means in a number of different forms, one of which comprises a plurality of spaced retaining elements or fingers and the other of which comprises a single ring interlocked with the rear side of the cover.

Yet another feature of the invention relates to the provision of a generally radially inwardly projecting extension on the retaining means apertured to snugly fit around the valve stem and formed to bottom against the base of the rim part adjacent the junction of that part with the body part of the wheel.

Other objects and features of this invention will more fully appear from the following detailed description taken in connection with the accompanying drawings which illustrate several embodiments thereof and in which.

Figure 1 is a fragmentary side view of a wheel having a cover structure of my invention applied thereto;

Figure 2 is an enlarged fragmentary cross-sectional view taken on substantially the line II—II of Figure 1 looking in the direction indicated by the arrows;

Figure 3 is a cross-sectional view similar to Figure 2 showing a modification thereof;

Figure 4:
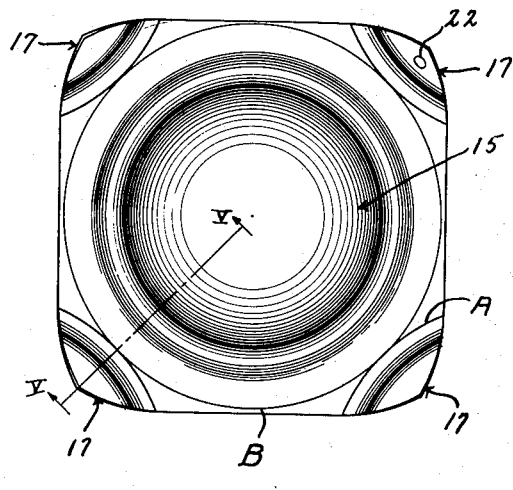
Figure 4 is a plan view of a stamping from which both the cover proper and the retaining elements of Figure 2 are made.
Figure 5:
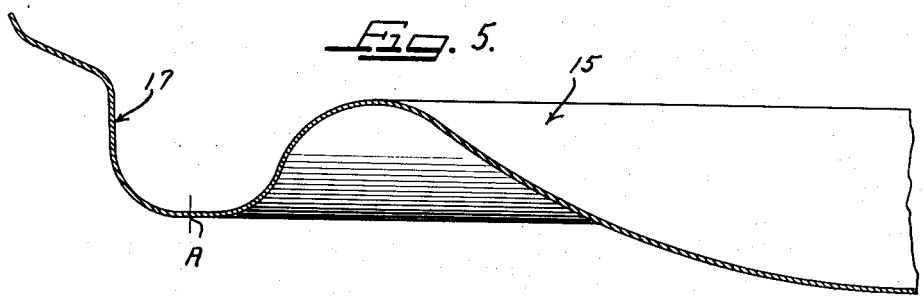
Figure 6:
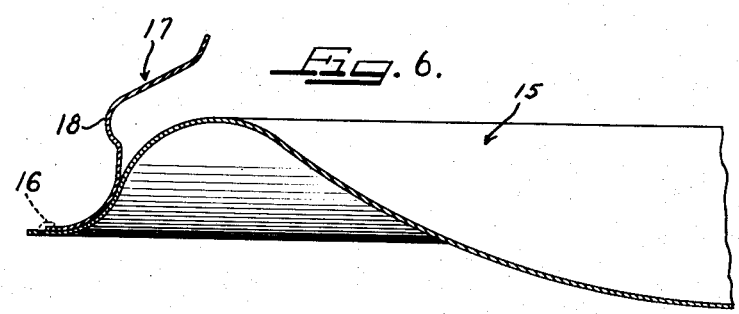

Figure 5 is an enlarged fragmentary cross-sectional view taken on substantially the line V—V of Figure 4, looking in the direction indicated by the arrows and showing at A the line of severance between the fingers and the cover body proper; and Figure 6 is a sectional view similar to Figure 5, showing how the fingers, after they are severed from the corners of the blank, are interlocked with the outer edge of the cover by the turning of the cover outer edge over the outer edges of the corners or fingers, as shown by dotted line.

As shown on the drawings:

The reference character 9 designates generally a pneumatic tire and tube assembly mounted in the customary way upon a multi-flanged drop-center tire rim 10 carried by a body part 11. The body part 11 comprises a dished metallic stamping and is connected at spaced intervals to the base of the tire rim, leaving spaced axial wheel openings 12, as is well known in the art. In addition, the body part 11 is centrally dished to provide a bolt-on flange 13 by means of which the wheel may be bolted through the use of cap screws (not shown) or the like. In addition, the tire and tube assembly 9 includes the usual valve stem 14 projecting laterally through one of the side flanges of the tire rim part so as to be accessible.

My invention relates to the provision of a wheel cover 15 for a wheel of the foregoing described type. More specifically, I aim to provide a cover which will extend over the exposed outer side flanges of the wheel tire rim part and which will cover the unsightly junction of the two wheel parts 10 and 11.

Also the cover must taken into consideration the valve stem so that it will not interfere with the use of the stem in the inflating of the tire. The cover 15 may be made of any suitable sheet material, such, for example, as stainless steel and may be fabricated in the manner I shall hereinafter describe in connection with Figures 4 to 6. This cover is of a covex-concave dished cross-sectional shape so as to closely follow, in a general way, the outer contour of the rim and body parts, and to extend into the space between these parts at their junction adjacent the wheel openings 12.

The outer edge of this cover 15 is slightly turned back upon itself to form a reinforced pry-off edge 16 for the cover, and also to interlock and secure to the cover cover-retaining means. This retaining means may take the form of a plurality of spaced retaining elements 17, such as four, or, as shown in Figure 3, may comprise a single annular transversely curved ring 17'.

Each retaining element 17 has a convex curvature complemental to the curvature of the outer margin of the cover 15 so as to snugly nest in the rear side of the cover. In addition, each of these retaining elements 17 has a ribbed or shouldered portion 18 adapted to resiliently and yieldably engage in an annular depression 19 in an axial flange of the rim part 10. Such an annular depression 19 is now commonly used on some automobile wheels and is used in connection with a so-called safety feature for the tire. In other words, the depression provides a rib on the underside of the rim for interlocking cooperation with a bead 9 of the tire. I propose to utilize this groove or depression in the retention of my cover on the wheel.

In addition, each element 17 includes a generally radially extending portion 21 closely following a side flange of the tire rim part and adapted to bear or bottom at 23 against the base of the tire rim part in close proximity to the wheel openings 12.

It should be noted that the retaining elements 17 are all identical in construction, with the exception that one of them is apertured, as at 22, so as to permit the valve stem 14 to extend therethrough. The cover 15 is also apertured with an aperture 25, which is aligned with the aperture 22 so that the free extremity of the valve stem 14 can extend through the cover and be accessible.

Due to the fact that the portion 21 of the apertured element 17 extends in close proximity to the flanges of the rim, I am enabled to have the edge of the aperture tightly fit the base of the valve stem. This is very advantageous where the valve stem is made of rubber, as is common practice these days, inasmuch as the valve stem is more rigid at its base than at its outermost portion. With this arrangement, therefore, it is possible to use the more rigid base of the valve stem to assist in the centering of the cover on the wheel.

It should, of course, be borne in mind that the humped or ribbed portions 18 on the spaced finger-like elements 17 are arranged in a common circle of a diameter slightly greater than the innermost diameter of the bottom of the annular groove 19 so that when the cover is pressed home the humps 18 will engage in the groove 19 under tension.

In mounting the cover on the wheel, the valve stem is first inserted through the holes 22 and 25 and then the cover is pressed axially toward the wheel until the finger portions 21 bottom at 23 against the rim part 10. It will also be perceived that the outer edge 16 is slightly spaced from the adjoining edge of the tire rim part so as to be readily accessible for engagement by a pry-off tool in the forcible ejection of the cover from its retaining cooperation with the wall of the groove 19. Furthermore the space between the outer margin of the cover and the outer flange of the tire rim part can be used to accommodate the usual wheel balancing weights (not shown). The cover thus does not interfere with the use of balancing weights.

In Figure 3 I have illustrated a modification of the invention wherein the wheel parts are identical to those shown in Figure 2 and for that reason the same reference characters as are used in Figure 2 to designate these parts are employed in Figure 3.

In the form of the invention shown in Figure 3 the cover 15' is of substantially the same general configuration as that of the cover 15. The outer turned edge 16' of this cover is interlocked with cover retaining means 17' nested in the rear side of the convexly-curved outer margin of the cover. This means 17', however, instead of being in the form of a plurality of spaced finger elements is in the form of a continuous ring which has an axially extending portion terminating in a protuberance or bead 18' snapped into the groove 19 in the rim part. This bead 18' is normally of a slightly greater diameter than that of the groove so that it will engage in the groove under tension.

The radially inner margin of the ring 17' is provided with an additional element 21' extending inwardly along a flange of the rim part and having an opening 22' through which the valve stem 14 extends. This extension 21' is also adapted to bottom at 23' on the rim part. The cover 15' is also provided with an opening 25' through which the valve stem 14 extends.

The application of this form of cover to the wheel is substantially similar to that of the first described form and hence no further description of the same is necessary.

It is believed that a better understanding will be had of the nesting relationship of the retaining fingers 17 with the outer margin of the cover from a description of how these fingers and the cover proper are made. For the purpose of simplicity I shall use the same reference characters as are used in connection with the cover 15 in describing the corresponding parts of the cover, including the retaining elements, in connection with Figures 4, 5 and 6.

The cover 15 is stamped from any suitable steel sheet material, such, for example, as stainless steel; and it is, of course, well known in the stamping art that it is desirable to use a hold-down track in the drawing operation. This track usually comprises the outer peripheral portion of the blank. For purposes of economy, I propose to utilize the four corners of the blank in the forming of the four retaining fingers 17. Thus the retaining fingers may be formed in the same stamping as the cover 15 and from stock that is normally waste material. The die (not shown) from which this stamping is made has portions complementary curved on opposite sides of the line of severance A between the cover stamping and the fingers. Line B designates a line of cut or trim of the blank from the remaining portion of the waste stock not going into the fingers 17. After the fingers have been severed on the line A, they are reversed in position, as shown in Figure 6 and are interlocked with the outer edge of the cover 15 by turning the edge, as shown by the full lines in Figure 6, to the dotted line position 16. Prior to this operation the fingers are placed in a suitable press and are given an operation to form the retaining hump or protuberance 18.

Now it is clear from the showing in Figures 5 and 6 that the complementary curvature of the severed portions or the fingers 17 and the outer margin of the cover permit of a snug nesting of the fingers on the back side of the cover by a mere reversing of the fingers from the position shown in Figure 5 to that shown in Figure 6.

I claim as my invention:

1. In a wheel structure including a wheel having a body part and a multi-flanged tire rim part carried thereby and having a generally axially extending flange with an outwardly opening annular groove therein as well as a valve stem projecting outwardly from a flange thereof adjacent said groove, a cover comprising a convexly dished circular member for disposition over the tire rim part and cover retaining means nested in the rear side of the convexly dished member and fastened thereto, said means extending from adjacent the radially outer edge of the cover generally radially inwardly and axially rearwardly and including radially outwardly projecting protuberance means of a diameter such that it can be snapped into said rim part groove, and said retaining means also including a generally radially inwardly extending portion for bottoming on the rim part adjacent the wheel body part and apertured to fit snugly around the base of the valve stem.

2. In a wheel structure including a wheel having a body part and a multi-flanged tire rim part carried thereby and having a generally axially outwardly extending flange with a radially inwardly opening annular groove therein, a cover comprising a convexly dished circular member for disposition over the tire rim part and cover retaining means nested in the inner side of the convexly dished member and fastened thereto, said means extending generally axially inwardly and including radially outwardly projecting protuberance means of a diameter such that it can be snapped into said rim part groove, and said means comprising a plurality of substantially identical elements spaced from each other on the inner side of the cover member and interlocked with an outer edge of the cover member, one of said elements having a portion projecting radially inwardly and provided with an opening through which the valve stem of the wheel can project and for snugly fitting around the base of the valve stem to retain the cover centered and against turning on the wheel.

3. In a wheel structure including a wheel having a body part and a multi-flanged tire rim part carried thereby and having a generally axially outwardly extending flange with radially inwardly opening annular groove therein, a cover comprising a convexly dished circular member for disposition over the tire rim part and cover retaining means nested in the inner side of the convexly dished member and fastened thereto, said means extending generally axially inwardly and including radially outwardly projecting protuberance means of a diameter such that it can be snapped into said rim part groove, and said means comprising a single annular ring interlocked with the outer edge of the cover member, said ring having a generally radially inwardly projecting portion for closely following and bearing against a radially and axially inner flange of the rim part and being provided with an opening through which the valve stem of the wheel can project.

4. In a wheel structure including a multi-flanged tire rim having an intermediate generally axially extending flange formed with a radially inwardly opening groove, a cover for the outer side of the wheel including a portion substantially concealing the tire rim and disposed in axially outwardly spaced relation thereto, said cover member having a radially outer portion of generally convex external form and concave inner cross-sectional form, and means for attaching the cover to the wheel including a member formed from sheet material and nested on the inner side of said concave convex portion of the cover member and secured thereto and extending generally radially and axially inwardly alongside the tire rim intermediate flange, radially outwardly retaining protuberance means on said member retainingly engaging in said groove, and means extending from said retaining member generally radially and axially inwardly beyond said protuberance means and engaging against the tire rim adjacent the base thereof.

5. In a wheel structure including a multi-flanged tire rim having an intermediate generally axially extending flange formed with a radially inwardly opening groove, a cover for the outer side of the wheel including a portion substantially concealing the tire rim and disposed in axially outwardly spaced relation thereto, said cover member having a radially outer portion of generally convex external form and concave inner cross-sectional form, and means for attaching the cover to the wheel including a member formed from sheet material and nested on the inner side of said concave convex portion of the cover member and secured thereto and extending generally radially and axially inwardly alongside the tire rim intermediate flange, radially outwardly retaining protuberance means on said member retainingly engaging in said groove, the tire rim having a valve stem opening therein in the side flange thereof inwardly from said groove, and said retaining member having means thereon projecting radially and axially inwardly from said retaining protuberance and arranged to engage snugly with the valve stem to hold the cover against turning on the wheel.

6. In a wheel structure including a vehicle wheel having a load sustaining body and a multi-flanged tire rim, the tire rim comprising a generally radial outer side flange merging with a generally axially extending intermediate flange and the latter flange in turn merging with a terminal flange, the side flange having a valve stem aperture, a circular cover for the outer side of the wheel and extending into substantially concealing relation to the outer side of the tire rim, and retaining and centering structure carried by the cover in concealed relation behind the margin thereof, said structure extending generally axially inwardly from the cover margin and having retaining means engageable with said tire rim intermediate flange and a plurality of annularly spaced generally axially and radially inwardly directed portions bearing against the tire rim side flange, one of said portions and the cover margin opposite the same having aligned openings for projection therethrough of the valve stem, said one portion engaging about the base of the valve stem to retain the cover against turning on the wheel.

7. In a cover structure for disposition at the outer side of a vehicle wheel having a load sustaining body and multi-flanged tire rim including a generally axially extending intermediate flange and a side flange with which the intermediate flange merges at its axially inner side with a valve stem opening through said side flange, a circular cover body for disposition at the outer side of the wheel, and means on the outer margin of the cover body comprising a generally axially inwardly extending flange having means projecting radially outwardly therefrom for retaining engagement with the intermediate flange of the tire rim, a portion of said axially inwardly extending flange projecting radially inwardly for engagement with the base portion of a valve stem projecting through the tire rim side flange valve stem opening whereby to retain the cover against turning on the wheel.

8. In a cover for disposition at the outer side of a vehicle wheel of the kind having a multi-flanged tire rim including a side flange apertured for projection therethrough of a valve stem, a circular cover member having a radially outer margin for substantial concealing disposition opposite the tire rim, and a member projecting generally axially inwardly from said outer margin for engagement with the base of the valve stem where it projects through said side flange for retaining the cover against turning on the wheel.

9. In a wheel assembly including a multi-flanged tire rim having an apertured side flange and a pneumatic tire and tube assembly supported thereby with a valve stem extending outwardly through said side flange of the tire rim, a wheel cover for the outer side of the wheel including a circular member having a radially outer margin for substantially concealing the tire rim, said margin having on the inner side thereof a plurality of members projecting generally axially inwardly and engaging said tire rim side flange to maintain the cover in predetermined axial position with respect to the tire rim, one of said members having an opening therein receptive of the valve stem and engaging at the base of the valve stem to hold the cover against turning.

10. In a wheel structure including a multi-flanged tire rim having side and intermediate flanges, a wheel cover for substantially concealing the tire rim and having a radially outer margin opposite said tire rim, and retaining and spacer members disposed in annularly spaced relation behind and carried by said cover margin and extending generally axially and radially therebehind, said members having portions thereof extending generally radially outwardly for retaining engagement against the intermediate flange of the tire rim and having portions projecting generally radially inwardly and engaging the tire rim in radially inwardly spaced relation to said intermediate flange for maintaining the cover in predetermined relation to the tire rim.

11. In a wheel structure including a wheel body and a tire rim having an outer side flange provided with a valve stem opening and merging with an intermediate flange joining a terminal flange portion, a cover on the outer side of the wheel comprising a body completely covering the wheel body in spaced relation and substantially covering the tire rim including said terminal flange, the outer marginal portion of the cover body having a plurality of generally axially inwardly extending resilient cover retaining elements located in peripherally spaced relation and extending inwardly in radially inwardly spaced relation to said tire rim intermediate flange and having portions thereof projecting generally radially outwardly and engaging the tire rim intermediate flange under resilient tension for retaining the cover against unintentional axially outward displacement but liable to rotary displacement due to torque forces, the periphery of the cover being spaced substantially from the adjacent portion of the tire rim, said retaining elements being spaced from the radially inwardly adjacent portions of the cover as well as being spaced from the tire rim intermediate flange and thereby substantially floatingly supporting the cover in radial respect so that the cover can move radially by resilient flexing of said elements upon the application of radial pressure against the cover and a member also on said outer marginal portion extending inwardly beyond one of said cover retaining elements for engagement with the base of a valve stem projecting through said valve stem opening in the side flange for holding the cover against turning on the wheel.

GEORGE ALBERT LYON.

References Cited in the file of this patent

UNITED STATES PATENTS

| Number | Name | Date |
| --- | --- | --- |
| 1,944,658 | Griffith | Jan. 23, 1934 |
| 2,239,366 | Lyon | Apr. 22, 1941 |
| 2,268,839 | Lyon | Jan. 6, 1942 |
| 2,304,584 | Lyon | Dec. 8, 1942 |
| 2,329,921 | Lyon | Sept. 21, 1943 |
| 2,345,283 | Mulhern | Mar. 28, 1944 |
| 2,347,206 | Lyon | Apr. 25, 1944 |
| 2,383,071 | Mulhern | Aug. 21, 1945 |
| 2,386,224 | Lyon | Oct. 9, 1945 |
| 2,404,389 | Lyon | July 23, 1946 |
| 2,404,390 | Lyon | July 23, 1946 |